United States Patent [19]
Florjancic

[11] 3,718,420
[45] Feb. 27, 1973

[54] APPARATUS FOR PRODUCING ANNULARLY CLOSED, INTERCONNECTED ELEMENTS

[76] Inventor: Peter Florjancic, St.-Martinstrasse, D-81 Garmisch-Partenkirchen, Germany

[22] Filed: Aug. 10, 1970

[21] Appl. No.: 62,402

[52] U.S. Cl........425/441, 425/DIG. 5, 425/DIG. 58, 249/57
[51] Int. Cl..............................................B29c 7/00
[58] Field of Search......18/DIG. 58, 2 RM, DIG. 5, 18/42 D, 425/441, 443, DIG. 5; 249/57

[56] References Cited

UNITED STATES PATENTS

| | | | |
|---|---|---|---|
| 3,490,100 | 1/1970 | Funke | 18/DIG. 5 |
| 2,358,857 | 9/1944 | Gits | 18/DIG. 5 |
| 3,469,284 | 9/1969 | Ross | 18/DIG. 5 |
| 2,382,873 | 8/1945 | Goodwin | 425/DIG. 5 |
| 2,875,472 | 3/1959 | Marcus | 425/DIG. 58 |

FOREIGN PATENTS OR APPLICATIONS

963,989 7/1964 Great Britain...............425/441

Primary Examiner—J. Spencer Overholser
Assistant Examiner—Michael O. Sutton
Attorney—Kemon, Palmer & Estabrook

[57] ABSTRACT

A device, such as a multi-part mold, for producing annularly closed interconnected elements from a material suitable to injection moulding. The parts of said mold being in two planes of division which are perpendicular to one another with said mold parts being provided with recesses corresponding to said annularly closed elements. The recesses of the mold parts lying in the first plane being designed to receive prefabricated interconnected elements and the recesses in the mold parts lying in the second plane receiving the new interconnected elements by injection of the moulding material.

5 Claims, 11 Drawing Figures

APPARATUS FOR PRODUCING ANNULARLY CLOSED, INTERCONNECTED ELEMENTS

This invention relates to a process for producing annularly closed, interconnected elements like chains, of a material adapted to injection moulding, by coating a prefabricated, annularly closed element in a mould consisting of not less than four parts, said mould parts contacting each other in a first plane being provided with recesses for receiving the prefabricated, annularly closed element, and said mould parts contacting each other in a second plane essentially perpendicular to said first plane being provided with recesses corresponding to said annularly closed element to be moulded. This invention is further concerned with a device for carrying out this process.

By coating prefabricated chain links with another link it is possible to produce chains without gluing or welding areas. This requires a four-part mould, with the prefabricated element lying in a first plane and the new element being injected into a second plane. In known devices the four mould parts move in an angel of approximately 45° relative to said planes during the removal. This implies the disadvantage that the shanks of the links cannot be rounded on the inside, but show a seam of approximately 90° between the surfaces. This is undesirable since the contact surface between the links is only punctiform in essential and therefore wears off strongly, in particular if motion chains are concerned. Though it is known and possible with the moulds used heretofore to give the vertex section of the arc between the shanks inside a semicircular shape, this arc of circle cannot be maintained over the whole arc between the shanks to make a removal possible. With increasing distance from the vertex of the arc it rather has to approach the 90° edge to an increasing extent. With a chain of this kind only line contact between the links is possible, and this only in extended condition of the chain.

The invention suggests a process which makes possible the production of a chain by means of a four-part mould with fairly any desired cross-sectional shape, like a chain with links limited by an arc of circle in all sections over the whole periphery inside. This is obtained in that during a first phase after moulding said mould parts are opened essentially in said second plane and during a second phase essentially in said first plane, the opening movement of the first phase being preferably continued at least during part of the second phase.

At least two mould parts are imparted at least two different directions of movement one after another, i.e., the mould parts are first removed from each other in the plane of the moulded part and subsequently perpendicularly thereto in order to release the previously inserted, prefabricated link. Since the first movement is done perpendicularly to the median plane of the link, the latter may show a surface inside extending perpendicularly to the median plane or having a tangent line in this direction. In particular, the cross-sectional area may be circular.

It may be convenient that both opening movements coincide temporarily, whereby the removal of this phase occurs in inclined position.

The correct succession of the movements may be controlled in any known manner, e.g., hydraulically. According to the invention it is proposed for a simple device that the movements are controlled by means of inclined planes and springs, all movements being derived from the opening movement of the locking plate; thus proper devices are not required. The device of the invention can be used in any injection moulding machine without additional expenditure.

The invention suggests further that not only the last link of a prefabricated part of a chain is coated, but in addition, a loosely prefabricated link is inserted into the mould and is coated simultaneously with the last link. Thus not only the speed of production is virtually doubled, but the production of a chain with alternately different links is possible., with colors, imprints or the shape being different.

It is convenient to feed the prefabricated links through a channel; it is of importance that the fed links are not simply arranged side by side, but displaced relative to each other; otherwise the chain would twist continuously and accordingly the winding device ought to be rotatably mounted.

Embodiments of the invention are hereinafter described with reference to the accompanying drawings, without the scope of the invention being limited to them.

Figure 1:
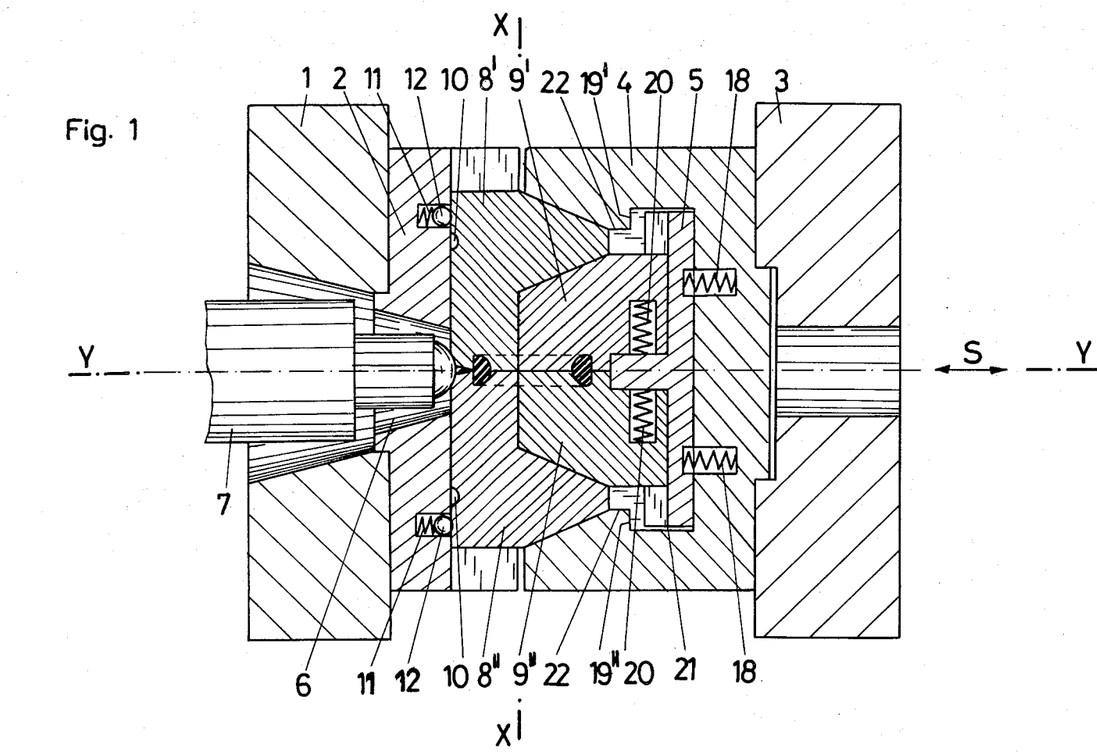
FIGS. 1 to 3 show an axial section of an injection moulding device of the invention for a chain link, the recesses in the mould parts for the prefabricated chain link inserted into the latter being omitted for reasons of clearness. On FIG. 4 the phases of the opening movements of the individual mould parts are illustrated on an enlarged scale.

As shown in FIG. 1, a first slide rail 2 is mounted on the fixed carrier plate 1 and a moulded block 4 is fixed to the locking plate 3 slidable in direction S, said moulded block carrying a second slide rail 5. The first slide rail 2 is provided with a central opening 6 for the moulding nozzle 7.

The mould itself consists of four parts, two of them 8', 8'' being slidably mounted in the first slide rail 2, the two others 9', 9'' in the second slide rail perpendicularly to the locking direction S of the locking plate 3.

Figure 3:
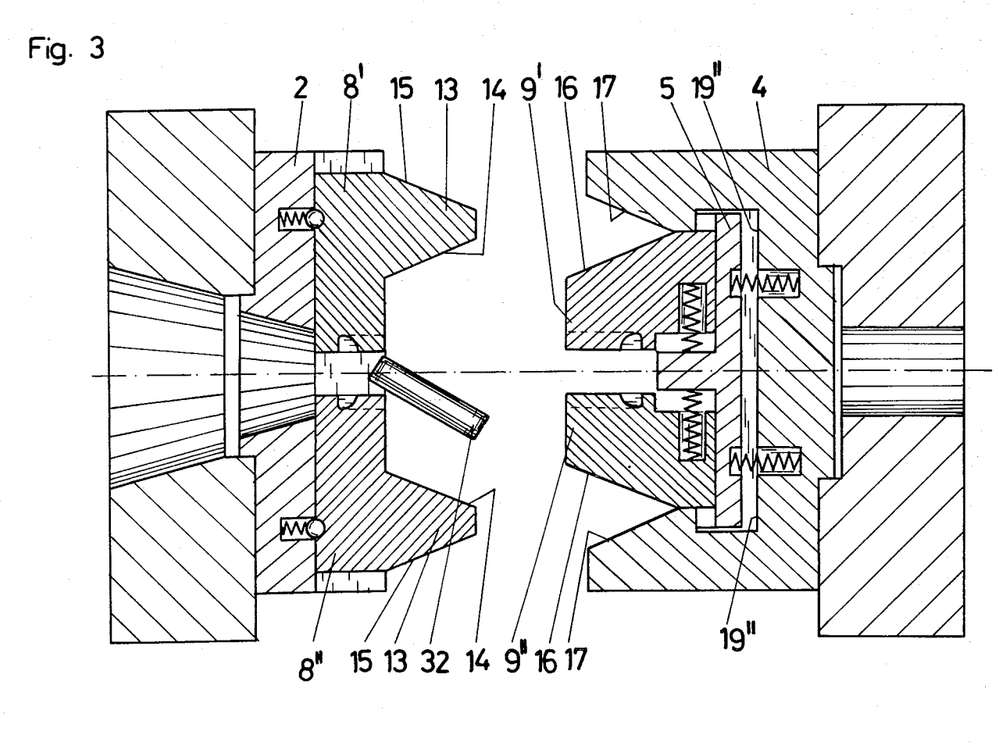

Each of the two moulding parts 8', 8'' mounted in the first slide rail 2 has a hemispherical recess 10 and two corresponding recesses with balls being under the pressure of a spring 11 are provided. Each of the mould parts 8', 8'' has a roof-shaped projection 13 with an inner inclined surface 14 and an outer inclined surface 15 on the side facing away from the slide rail 2. (FIG. 3)

Each of the two mould parts 9', 9'' mounted in the second slide rail 5 is provided on its outside with a chamfered guiding plane 16, whose angle of slope is equal to that of the guiding planes 14 on the mould parts 8', 8''.

Further inclined guiding surfaces 17 are provided on the moulded block 4 which correspond to the outer guiding surfaces 15 on the mould parts 8', 8'' as to position and slope.

The second slide rail 5 is slidably mounted in the moulded block 4 in locking direction S, with springs 18 being provided between the moulded block 4 and the slide rail 5.

The axial movement of the slide rail 5 is limited by stop surfaces 19', 19'' of the moulded block 4.

Two further springs 20 are provided between a reinforcing rib 21 of the second slide rail 5 and the mould parts 9', 9'' slidably mounted therein. Two stop surfaces 22 on the moulded block 4 limit the movement of the mould parts 9', 9''.

Thus the mould has two planes X, Y, said first plane lying perpendicularly to the locking directions S, said second plane extending through the machine axis.

The device described hereinbefore acts as follows:

If, issuing from the locking position of the mould shown in FIG. 1, the locking plate 3 with the moulded block 4 secured thereon, is moved away from the carrier plate 1, the mould parts 8'' and 9'' on the other remain axially adjacent and remove from each other perpendicularly to the opening direction, i.e., along the plane 4, with appropriate choice of the spring forces and angles of slope. The surfaces 15 and 17 slide on each other and the springs 18 extend till the second slide rail 5 abuts against the stops 19' (FIG. 1).

With further movement of the locking plate 3 the mould parts 8' and 9'' or 8'' and 9'' remove from each other in axial direction; the action of the springs 20 secures that the sliding planes 15 and 17 as well as the sliding planes 14 and 16 remain adjacent and slide on each other, Thus the mould parts are not only opened axially (plane y), but further perpendicularly (plane X).

Not before the mould parts 9' and 9'' abut against the stops 22 in the moulded block 4, the mould is completely opened in purely axial direction (FIG.3). In this position the balls 12 are engaged in the recesses 10 and thus hold the mould parts 8', 8'' in distance from each other.

During the locking operation the same operations recur in inverse order.

Figure 4:
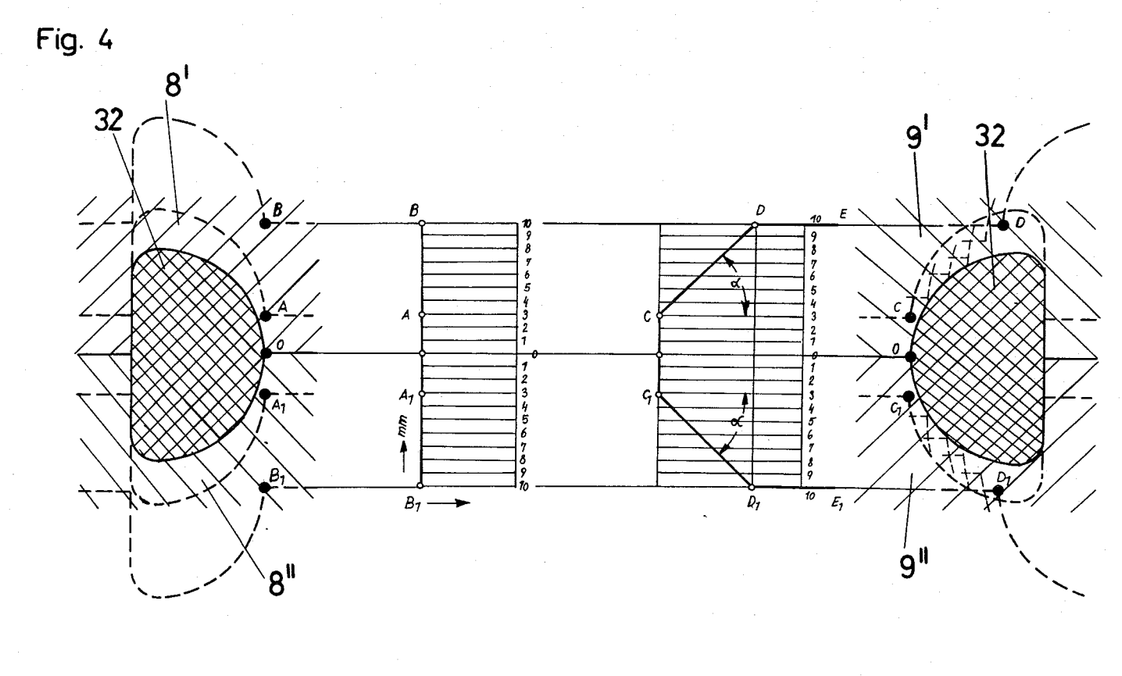

FIG. 4 is a diagrammatic view of the removal of a chain link 23 with approximately semicircular cross-section. On the left the movement of the mould parts 8' and 8'' is shown, said diagram reproducing the points of the path in relation to the opening movement. The right side applies for the mould parts 9' and 9'' accordingly. The path of the latter is composed of three straight lines O-C, C-D and D-E. It is obvious that the edge of the mould part 9' lying in O in the locking position is thus passed by the circular surface of the moulded part 23 and that removal first takes place purely radially, then obliquely and finally purely axially.

FIGS. 5 to 11 illustrate a proposal according to the invention by means of which two prefabricated chain links are coated simultaneously. The individual figures show successive operations.

Figure 2:
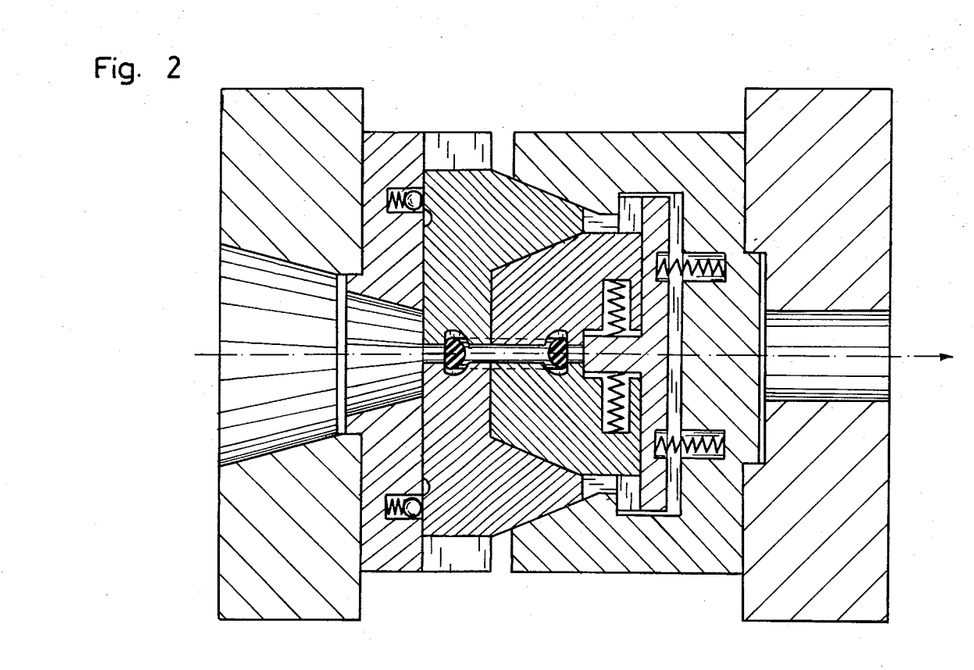

Moulded block, slide rails and mould parts are essentially equal to those described in FIGS. 1 to 3, with the exception of the mould parts 8' and 8'' having a recess, each, for receiving a feed channel 24 for the prefabricated chain part. The feed channel 24 is rotatably mounted about pin 25, its lower end being pressed by a spring 23 towards the mould parts 9', 9''. The feed channel 24 consists of two part channels 24', 24'', adapted,each, to receive a series of superposed chain links. Both channel parts are so displaced relative to each other that the shanks 26 of the prefabricated chain links lying in the channel parts 24', 24'' are in alignment, viewed in locking position S and lie in the perpendicular plane of symmetry of the link 23 to be moulded. The lower end of each of the channel parts 24', 24'' is provided with a springly tongue 27 which engages in the arc of the prefabricated chain links 31, 33 etc. and holds them firmly. Finally a device not shown is provided which alternately presses on the chain links 51, 53 in the channel parts 24', 24'' from the top, whereby the lowest link pushes the springly stop 27 aside and thus can fall out of the mould. The pressure of said device is indicated on FIGS. 6 and 9 by arrows $D_1$ and $D_2$.

Figure 5:
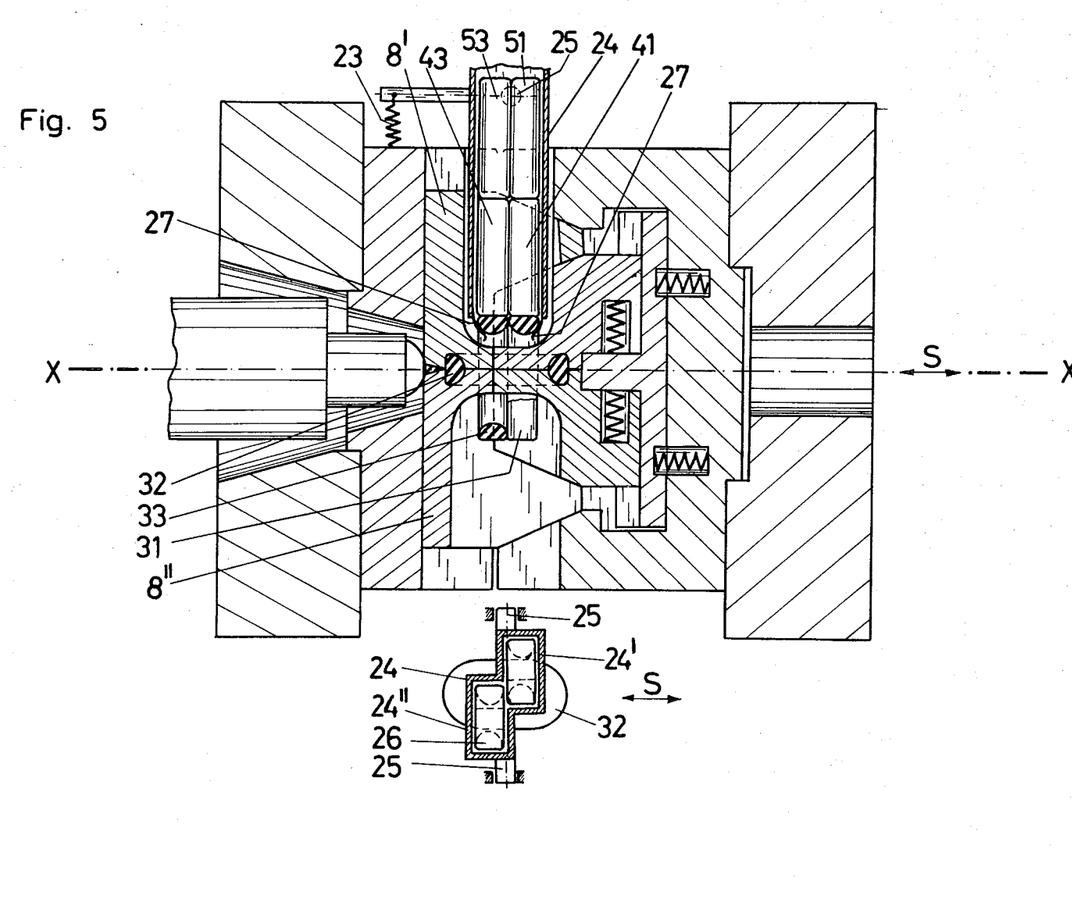
FIGS. 5 to 11 show a device for the production of link chains with the single operations.

The last described device acts as follows:

FIG. 5: The prefabricated links 31 and 33 are inserted in the closed mould and are coated by the link 32.

Figure 6:
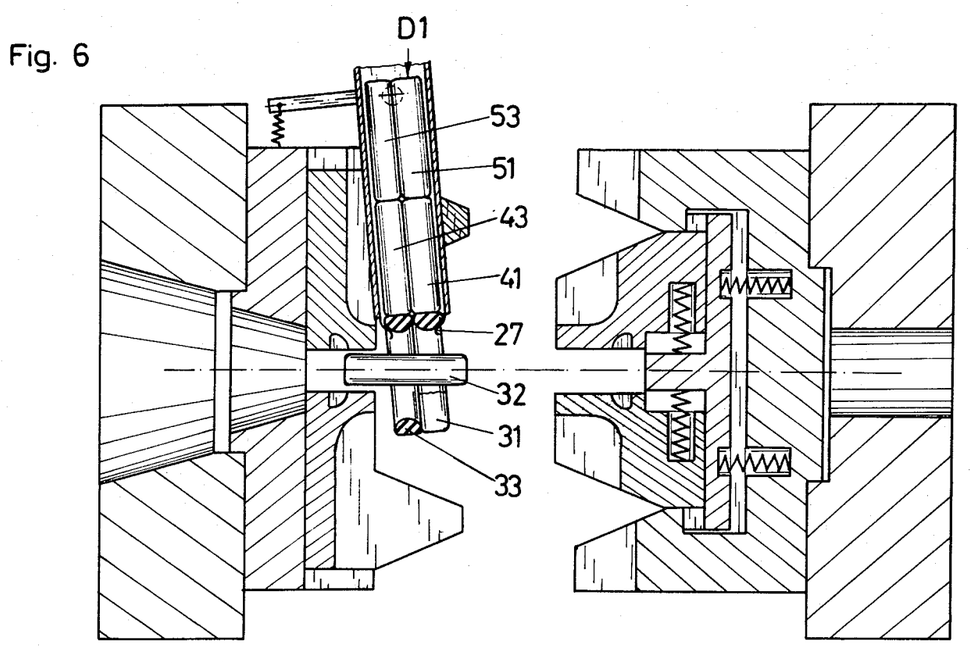

FIG. 6: The mould is opened, the feed channel is moved away from the carrier plate under the action of the spring, thus having withdrawn the newly moulded link 32 out of the mould. The supply device exerts a pressure $D_1$ on the links in the channel part 24'.

Figure 7:
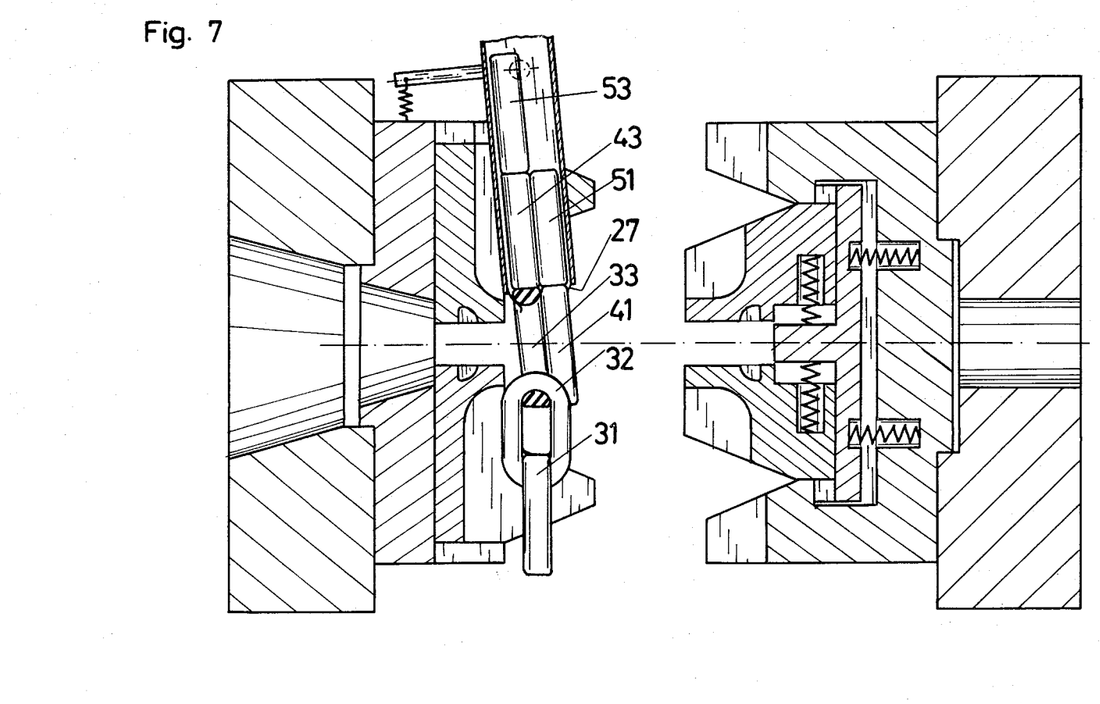

FIG. 7: Under the action of the pressure $D_1$ the link 31 has fallen downwardly, with the stop 27 springing back; it is not imparted any rotational movement, but only displaced to the left. The link 41 has followed the slide and is maintained on the level of the mould by the stop 27.

Figure 8:
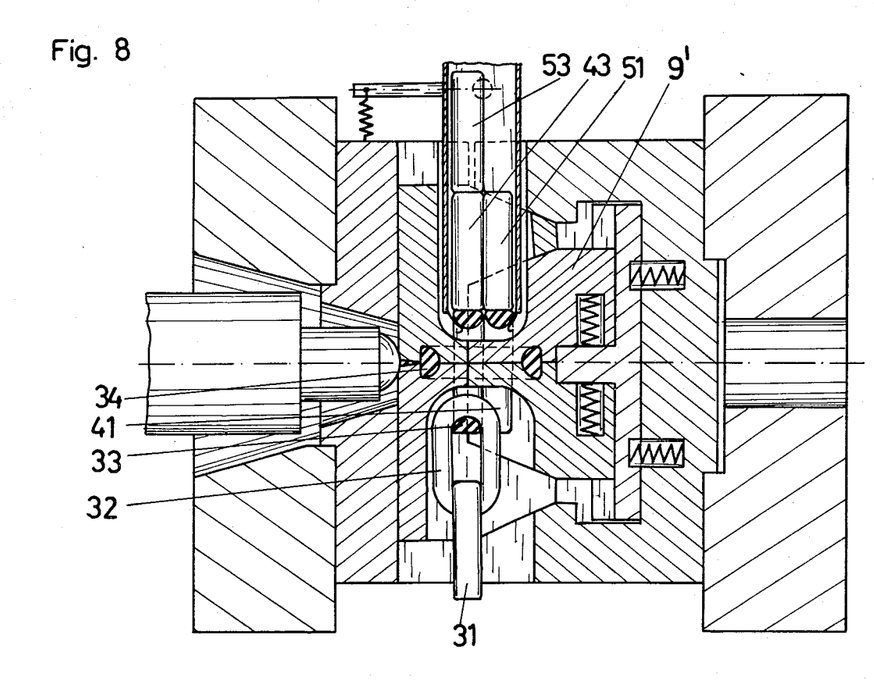

FIG. 8: The mould is closed again, the feed channel with the links 33 and 41 hanging thereon having been moved to the left by the mould part 9'. The link 34 is moulded.

Figure 9:
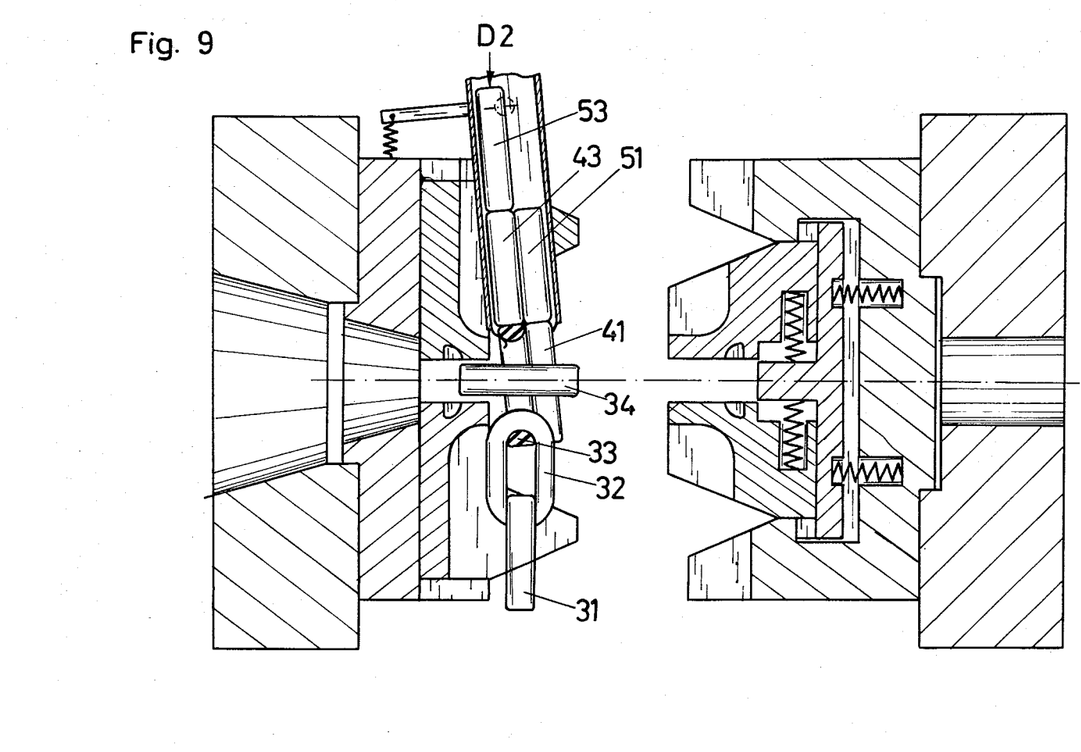

FIG. 9: The mould is opened again, the feed channel is moved to the right, the link 34 is withdrawn out of the mould. Pressure $D_2$ is exerted on the link 53 in channel part 24''.

Figure 10:
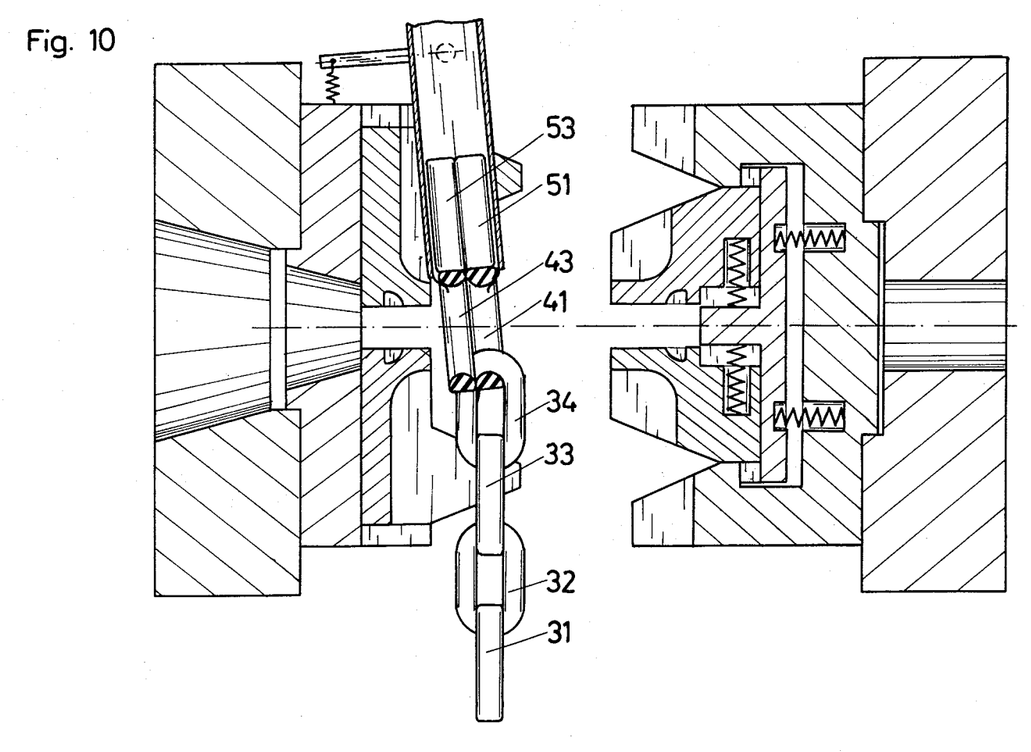

FIG. 10: The link 33 has slided away from the springly stop and has taken along the newly moulded link 34 in its fall, said link 34 now hanging in link 41. No rotational movement of the link 33 and thus of the links 32 and 31 has taken place either.

Figure 11:
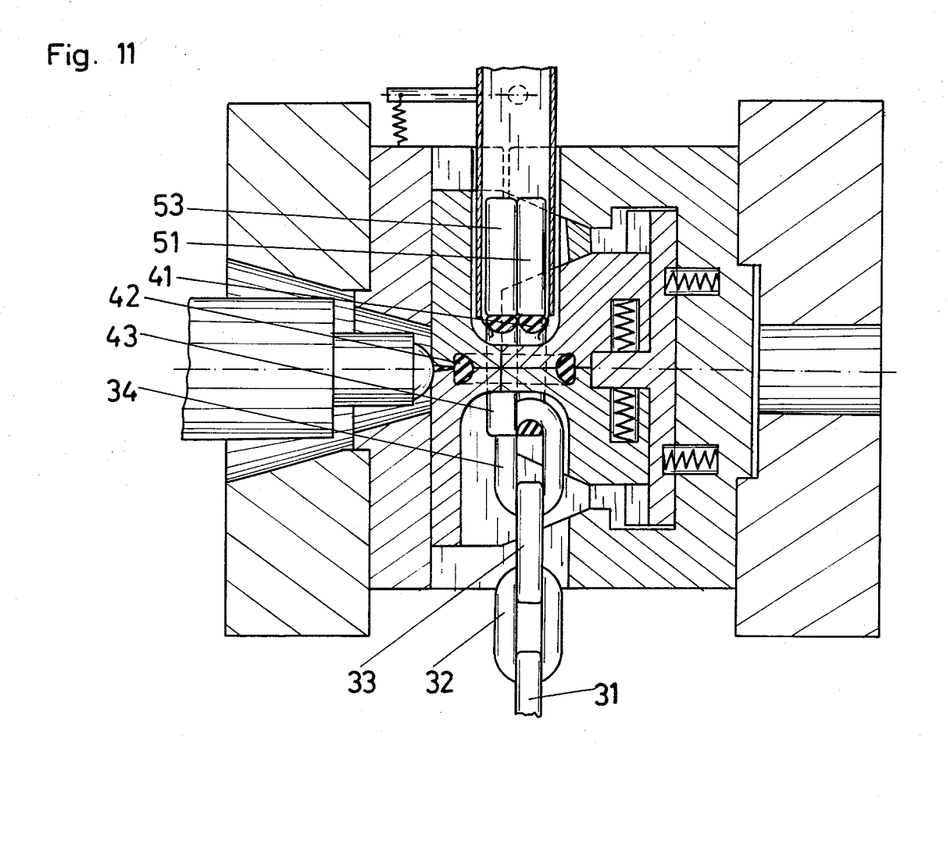

FIG. 11: The position of the parts corresponds to that in FIG. 5 with the exception that links 41, 42 and 43 etc. have replaced links 31, 32, 33 etc.

Numerous variants may be made within the scope of the invention. For example, the opening movements in both planes may be so controlled that the edge of the mould part follows the outline of the moulded body; thus in the case of the shown chain link it moves on a circular path. Furthermore, the guiding planes need not align areally (though this is desirable in view of the required great holding forces), but may have curve shapes with line contact, whereby any desired path lines may be obtained. A guidance through lever systems, cam plates or the like is also possible. It may be convenient to move the mould parts unsymmetrically to the machine axis or to firmly connect a part to the carrier plate or locking plate. Instead of a swinging, a translatory mounting, for example by means of sliding guides, may be provided.

It is expressly stated that the term "prefabricated link" does not say that the link to be coated is fabricated on another machine. It is possible to coat one link after another on one sole machine. In this case the device must be adapted to remove the link moulded in said first plane from the mould and insert it into said second plane after rotation by 90°, whereafter a new link is moulded after the mould has been closed.

What I claim is:

1. A device to be mounted on a moulding machine comprising a carrier plate with a first slide rail provided with a central opening for the moulding nozzle, and a locking plate bearing a moulded body in which a second slide rail is slidably mounted between two first stops in direction of the movement of the locking plate, with at least one spring being provided between said second slide rail and said moulded block, said spring tending to move said second slide rail towards said first slide rail, and a mould consisting of four parts, two parts being mounted in each slide rail, with at least one part in each slide rail being slidable perpendicularly to the movement of said locking plate, with said moulded block having two second stops, with at least one spring being provided between the two parts of said mould mounted in said second slide rail, wherein said spring tends to press said two parts apart towards said second stops, with a first and a second guiding plane being provided on each of the parts of the mould mounted in said first slide rail, a third guiding plane being provided on each of said parts of the mould mounted in said second slide rail and two fourth guiding planes being provided on said moulded block and wherein one first and one third and one second and one fourth guiding plane contact each other at least in closed condition of said mould, for producing a chain of links wherein a feed channel for prefabricated links is provided, with the axis of said feed channel being essentially perpendicular to said second plane and, viewed in direction of the locking movement, being adapted to receive two links one after another.

2. A device as claimed in claim 1 wherein said feed channel consists of two part channels which are displaced relative to each other essentially in parallel to the sectional axis between said two planes at least to such extend that one and one shank of each of two chain links lying one behind the other are in alignment, viewed in direction of the locking movement.

3. A device as claimed in claim 1 wherein said feed channel is mounted preferably by means of pins and the end of said feed channel facing the mould is movable in direction of the locking movement.

4. A device as claimed in claim 1 wherein springy stops for the prefabricated chain links are provided at the end of said feed channel facing the mould.

5. A device as claimed in claim 1 wherein a pressure member imparts to said links lying one behind another in said feed channel a feed movement towards said mould.

* * * * *